United States Patent [19]

Ogasa et al.

[11] 4,140,811
[45] Feb. 20, 1979

[54] METHOD FOR MANUFACTURING ROUGH TEXTURED SOYA BEAN CURD

[75] Inventors: Katsuhiro Ogasa; Kunisuke Kuwahara, both of Yokohama; Rye Kato, Yokosuka, all of Japan

[73] Assignee: Morinaga Milk Industry Co., Ltd., Tokyo, Japan

[21] Appl. No.: 823,273

[22] Filed: Aug. 10, 1977

[30] Foreign Application Priority Data

Aug. 11, 1976 [JP] Japan .................................. 51-94952

[51] Int. Cl.² .......................... A23J 3/00; A23L 1/20
[52] U.S. Cl. .................................... 426/634; 426/582; 426/521; 426/656
[58] Field of Search .................. 426/46, 573, 574, 598, 426/634, 656, 521, 582

[56] References Cited

U.S. PATENT DOCUMENTS

| | | | |
|---|---|---|---|
| 3,489,570 | 1/1970 | Noznick et al. | 426/46 |
| 3,857,970 | 12/1974 | Tsumura et al. | 426/46 |
| 3,944,676 | 3/1976 | Fridman et al. | 426/46 |

FOREIGN PATENT DOCUMENTS 20381 7/1969 Japan.

OTHER PUBLICATIONS

Smith, A. K., et al., "Tofu from Japanese and United States Soybeans", Food Technology, 1960, vol. XIV#7, pp. 332–336.

*Primary Examiner*—Robert A. Yoncoskie
*Attorney, Agent, or Firm*—Oblon, Fisher, Spivak, McClelland & Maier

[57] ABSTRACT

A method for manufacturing rough textured soya bean curd of long shelf life from conventional soya bean juice comprises the steps of heat-sterilizing the soya bean juice, adding a coagulant to the sterilized soya bean juice to form coagulum, adjusting the water content of the coagulum to 78% to 90% by weight, packing the adjusted coagulum into a container followed by hermetically sealing and shaping the coagulum by heating.

9 Claims, No Drawings

METHOD FOR MANUFACTURING ROUGH TEXTURED SOYA BEAN CURD

BACKGROUND OF THE INVENTION

1. Field of the Invention

The present invention relates to a method of manufacturing rough textured soya bean curd (so called "momen tefu" in Japan) of long shelf life by obtaining coagulum from heat-sterilized soya bean juice by adding a coagulant after cooling, adjusting the water content of the coagulum by dehydrating using a centrifuge, packing the partially dehydrated coagulum into a container, sealing the container hermetically and heating.

2. Description of the Prior Art

Recently, the shelf life of the fine textured soya bean curd (so called "kinugeshi tefu" in Japan) has been improved by packing it in an aseptic container and soya bean curd of long shelf life is now supplied to the market as a ready-packed food. However, no product of long shelf life has been supplied hitherto for rough textured soya bean curd. Commercial rough textured soya bean curd products at the present time are manufactured using the traditional process. That is, the coagulum obtained from pasteurized soya bean juice using coagulants such as calcium sulfate and the like is separated from the supernatant liquid, transferred to a perforated shaping box made of weed or stainless steel with a cloth spread inside, and shaped by pressing and removing the exuded liquid. The curd thus obtained is finally dipped in water to remove excess coagulant.

Rough textured soya bean curd now on the market, produced by the traditional method has several defects, such as:

(1) Spere-forming bacteria survive in the products because of the imperfect sterilization of the soya bean juice at about 100° C.
(2) The products are markedly contaminated by microorganisms because of the dehydration-shaping in a mold-box with a cloth.
(3) The water-dipping process of the product is indispensable.

As a result of these defects, the rough textured soya bean curd on the market is apt to putrefy within a relatively short time. Furthermore, the traditional manufacturing process for rough textured soya bean curd is not suitable to be developed for mass production because of its household nature.

However, several potential improvements have recently been disclosed for the manufacture of the rough textured soya bean curd. Patent applications have been made for these improvements as stated below.

The invention disclosed in the specification Japanese Patent Public Disclosure No. 110847/1974 is a manufacturing method for rough textured soya bean curd which has long shelf life. The method comprises the steps of enclosing the conventional rough textured soya bean curd in a heat-resistant container with subsequent sealing and pasteurizing it in a hot atmosphere between about 85° C. and 100° C. This method is merely an addition of a heating step to the traditional manufacturing method for rough textured soya bean curd. The shelf life of the soya bean curd by the method is somewhat longer than that of the conventional products on the market but still insufficient. The texture and the flavor of the products are less acceptable than that of the conventional one at the present time and the mass production is difficult.

The other invention disclosed in the specification Japanese Patent Public Disclosure No. 7451/1974 is a manufacturing method for rough textured soya bean curd like product which comprises the steps of making coagulum from soya bean juice by the conventional process, dehydrating the coagulum, admixing the dehydrated coagulum with soya bean juice containing a coagulant, packing the treated coagulum into a container, hermetically sealing, heating and cooling the container. The shelf life of the product by the method is short because of the lack of the sterilization step by heating in order to kill spore-forming bacteria present in the soya bean juice and because of incorporating the dehydrating step in the process as in the traditional manufacturing of the rough textured soya bean curd. Continuous mass production by this method is also difficult. Actually the method is not a process for manufacturing rough textured soya bean curd through a direct heating step of the coagulum itself obtained from the soya bean juice.

Further, one more invention disclosed in the specification Japanese Patent Public Disclosure No. 140650/1975 is a manufacturing method for rough textured soya bean curd characterized in comprising the steps of forming a block of coagulum obtained from soya bean juice by adding an appropriate amount of a suitable coagulant to the soya bean juice at a temperature in the range from 60° C. to 100° C., crushing down the block of the coagulum homogeneously and then allowing it to stand, optionally, with heating. Even in this specification, the step of sterilization of the soya bean juice at a temperature of 120° C. or higher is not described as one of the necessary steps for manufacturing rough textured soya bean curd. In addition to the above, products with elasticity and pleasantness on the tongue are not obtained by this method, because it comprises the step of homogeneous compression of the coagulum once formed.

Each of the above-described recent methods for manufacturing rough textured soya bean curd still suffers from one or more deficiencies such as the complication of the process, insufficient stability of the shape of the product innate in rough textured soya bean curd, lack of an advantageous step as illustrated by mere addition of a heating step to the traditional method, impossibility of obtaining rough textured soya bean curd which has long shelf life, good flavor and good body, and inadaptability to continuous mass production.

It is obvious that a product of long shelf life can not be obtained by any of the known methods for manufacturing rough textured soya bean curd. Particularly, the sterilization effect against spore-forming bacteria in soya bean juice is ineffective at the pasteurization temperature adopted in the conventional method of manufacturing rough textured soya bean curd. So the conventional rough textured soya bean curd usually putrefies because of the presence of spore-forming bacteria which survive in the product. Furthermore, it is obvious, as will be shown afterwards that rough textured soya bean curd with any commercial value is not obtained by shaping of the coagulum by compression following the heat-sterilization of the soya bean juice at a high temperature of 120° C. or higher.

SUMMARY OF THE INVENTION

The object of the present invention is to provide a method of manufacturing rough textured soya bean curd, which has long shelf life. This object is easily attained by a method comprising the steps of:

(1) sterilizing conventional soya bean juice by heating the juice at a temperature of at least 120° C. followed by cooling;
(2) adding a coagulant to the sterilized soya bean juice to form a coagulum;
(3) partially dehydrating the coagulum by use of a centrifuge to adjust its water content to 78% to 90% by weight;
(4) packing the thus dehydrated coagulum into a container;
(5) sealing the container hermetically; and
(6) heating at a temperature between 60° C. and 135° C.

Large quantitites of rough textured soya bean curd can be produced continuously by the method. The product not only has far longer shelf life than that of the conventional soya bean curd, but good flavor and body. Further, a controlled degree of elasticity may be imparted, if desired, to the product and no dipping step is required in water because of the comparatively smaller amount of the coagulant used.

DETAILED DESCRIPTION OF THE PREFERRED EMBODIMENT

This invention relates to a method of manufacturing rough textured soya bean curd, so called "momen tefu" in Japan, which has long shelf life, good flavor and body.

Soya bean curd is a nutritious food containing protein of high quality and advantageous over meat in combination with a vegetable oil rich in lineleic acid, so that it consequently has been a familiar and ages old food for the Japanese people. Particularly, rough textured soya bean curd is harder than other kinds of soya bean curd and has a stable shape. Therefore, it is suitable as a material for boiled or broiled dishes. However, soya bean curd has the disadvantage that microorganisms readily grow in the same so that it readily putrefies, such that the shelf life is only one or two days even in a refrigerator. Therefore, a serious problem remains in the distribution of soya bean curd as a commerical product.

The object of the present invention is to provide a continuous manufacturing method for rough textured soya bean curd which is superior in flavor, texture and shelf life to the rough textured soya bean curd conventionally on the market in large quantities.

The inventors of the present invention have discovered, after extensive investigations that a very excellent product of rough textured soya bean curd having the above properties can be obtained through a process comprising the steps of separating coagulum with a controlled water content from soya bean juice sterilized by heating at a temperature of 120° C. or higher, and heating the coagulum in a sealed container.

The invention relates to a manufacturing method for rough textured soya bean curd of long shelf life characterized in the steps of sterilizing conventional soya bean juice at a temperature of 120° C. or higher, cooling it, adding a coagulant to the sterilized soya bean juice to form coagulum, dehydrating the coagulum to a water content in the range from 78% to 90% by weight, packing the dehydrated coagulum into a container, sealing the container hermetically, and heating the coagulum packed in the sealed container.

The soya bean juice used in the present invention is prepared via an ordinary process with whole or defatted soya beans as the principal raw material. Defatted soya bean powder commercially available can be also used as the raw material of the soya bean juice in the present invention.

The soya bean juice thus prepared is stocked in a storage tank and the solid content of the juice is adjusted to 3% to 12% by weight. When the solid content of the juice is below 3% by weight, treating a large volume of liquid is required and the yield of the coagulum drops owing to the incompleteness of the coagulation reaction. On the other hand, when the solid content of the soya bean juice exceeds 12% by weight, smooth operation of the sterilizer cannot be expected because of the adhesion of the coagulum to the heating plate. Therefore, the preferred range of the solid content of the soya bean juice is 3% to 12% by weight. Any type of sterilizer used in dairy processing for sterilizing cow's milk can be applied for this purpose. For example, both a plate-type sterilizer and a direct-heating sterilizer are suitably used in the method. If there are ten or more spore-forming bacteria per 1 ml of sterilized soya bean juice, the shelf life of the product is greatly shortened and a rough textured soya bean curd of long shelf life cannot be obtained. Therefore, sterilizing conditions must be such that the surviving spore-forming bacteria in the soya bean juice after sterilization number less than ten per ml in order to manufacture rough textured soya bean curd of long shelf life through the process of the present invention. The heating conditions to realize such a sterilized condition include keeping the soya bean juice for at least 6 seconds at 120° C. The heating scheme has been verified by TEST 1 described below:

TEST 1

Soya bean juice with a solids content of 6.0% by weight, prepared by the conventional process using the above noted raw materials was subjected to preliminary heating for 10 minutes at 80° C. and then heated using a plate-type UHT sterilizer (model HX, manufactured by APV Company) for one to 20 seconds at 110° C., 115° C., 120° C., 124° C. or 128° C. as shown in TABLE 1 to give 11 lots of test samples. The treating times of the soya bean juice were controlled by the number of plates, flow rates, and use of a bypass. The soya bean juice was then cooled by passing it through a plate cooler after heating at each temperature for the predetermined time. About a 50 ml portion of the soya bean juice was separated from each lot in a germ-free bottle under a germ-free atmosphere, and tests for spore-forming bacteria were carried out by the conventional manner. The colonies of spore-forming bacteria were counted. The number of colonies of spore-forming bacteria are indicated in TABLE 1 by the following notations:

| number of colonies per ml of soya bean juice | indication |
| --- | --- |
| more than 100 | ++ |
| 10 to 100 | + |
| less than 10 | ± |
| none | − |

TABLE 1

| Test Nos. | Heating Conditions | | Number of colonies of the spere-forming bacteria |
|---|---|---|---|
| | Heating Temp. (° C) | Heating time (seconds) | |
| 1 | 110 | 10 | ++ |
| 2 | 110 | 20 | + |
| 3 | 115 | 10 | + |
| 4 | 115 | 20 | + |
| 5 | 120 | 4 | + |
| 6 | 120 | 6 | ± |
| 7 | 124 | 1 | + |
| 8 | 124 | 2 | ± |
| 9 | 124 | 4 | ± |
| 10 | 128 | 1 | ± |
| 11 | 128 | 2 | − |

As shown in the table, sterilization to an extent such that the number of colonies of spore-forming bacteria in 1 ml of the soya bean juice is less than 10 may be achieved by heating for 6 seconds at 120° C., for 2 seconds at 124° C. or for one second at 128° C.

The soya bean juice thus sterilized is then cooled and stocked in a storage tank, and a required amount of the soya bean juice for the manufacturing of curd is transferred to a reaction vessel for batchwise coagulation. In the coagulation step, a coagulant is added to the sterilized soya bean juice held at a temperature in the range from 20° C. to 90° C. and the coagulum is formed by allowing the juice to stand still for a time. The coagulum is then homogeneously compressed by agitation, separated from the liquid component using a centrifuge or the like, transferred to a filling-up machine by the aid of a press extruder and subsequently a pump, and packed into containers which are sealed hermetically thereafter. The coagulant is added to the soya bean juice desirably when the temperature of the juice is at about 70° C. just as in the traditional manufacturing of rough textured soya bean curd but a temperature in the range from 20° C. to 90° C. is also operable. When the temperature of the juice is below 20° C., formation of the coagulum is not complete, and when the temperature exceeds 90° C., the reaction accelerates to such an extent that no homogeneous coagulum can be obtained. Calcium sulfate is the most preferred coagulant in the method of the present invention, but other salts of divalent metals such as calcium chloride, magnesium chloride and the like can also be used although a coarser textured coagulum is formed. Further, organic coagulants such as glucone-delta-lactone and organic acids including citric acid, lactic acid and the like may also be used. In addition, a divalent metal salt and an acidic coagulant may be used in combination. When a divalent metal salt is used as the coagulant, a concentration of 7 to 35 millimoles per liter is recommended which is lower than the concentration of 20 to 50 millimoles per liter used in the conventional manufacturing process. When the concentration of the coagulant is lower than 7 millimoles per liter, the formation of the coagulum becomes incomplete, and when the concentration exceeds 35 millimoles per liter, the product acquires an astringent taste or a bitter taste which is undesirable. Acidic coagulants are used to form coagulum preferably in an amount such that the pH of the soya bean juice becomes 4.8 to 5.8. For instance, citric acid is added to soya bean juice containing 10.5% by weight of solid in an amount such that the concentration is 5.7 to 19 millimoles per liter. When a combination of a divalent metal salt and an acidic coagulant is used, further tolerance in the amount is allowed. In practice, a favorable product was obtained with 5 millimoles per liter of citric acid and 3 millimoles per liter of calcium sulfate in a soya bean juice containing 12% by weight of solid component. In the traditional method of manufacturing rough textured soya bean curd the step of dipping in water to remove the excess coagulant is indispensable in order to obtain products of good flavor because of the use of an excess amount of coagulants. On the other hand, products of good flavor can easily be obtained without the step of dipping in water in the method of manufacturing according to the present invention owing to the use of comparatively small amounts of coagulants. The omission of dipping greatly facilitates continuous and large scale production, which is impractical in the traditional method of manufacturing. Of course, the production cost is reduced because of the fact that the amounts of the coagulants required for the rough textured soya bean curd are about half those required in the traditional manufacturing process.

The coagulum thus obtained is then dehydrated using a centrifugal separator or the like after being compressed with an agitator. It is possible to easily produce rough textured soya bean curd with varied elasticity and consistency conforming to various culinary uses by controlling the degree of dehydration. The relationship between the water content of the coagulum and the consistency of the product was determined by the following TEST 2.

TEST 2

One liter of soya bean juice of solid content 6.5% by weight was sterilized by heating for 4.8 seconds at 130° C. using a plate-type sterilizer Model R-50 (manufactured by APV Company), admixed with 5.16 g of solid calcium sulfate while being kept at 70° C. and stirred, followed by standing still for 10 minutes. Then the formed coagulum was crushed down homogeneously and separated from the liquid using a cooling centrifuge (manufactured by Tominaga Manufacturing Co., Model 90-UV) for 5 minutes of centrifuging at a rate of 500 r.p.m. This sample was designated as Sample No. 1. A portion of the coagulum, Sample No. 1 was taken and its water content was determined 3 times according to the conventional method. The average value is shown in TABLE 2. On the other hand, 200 ml of the separated coagulum was packed in a bag made of a nylon-polyethylene laminated sheet and the bag was sealed hermetically. The bag was placed in a rectangular parallelepiped box (length 110 mm, width 60 l mm and depth 32 mm) made of a plastic and heated for 40 minutes at 90° C. in hot water as it is. The curd-tension of the products thus formed was determined 3 times according to the method described hereinafter to give averaged values as set out in TABLE 2. Furthermore, several samples (Samples No. 2 to No. 7) were prepared similarly but with varied centrifuging conditions listed in TABLE 2, and the water content of each of the coagulum and the curd-tension of the final products were determined by the same method. The averaged test results of each 3 determinations are listed in TABLE 2. In addition to them the test results for the rough textured soya bean curd on the market (Sample No. 8) are similarly shown with the object of comparison. The curd-tension was determined using a Nakamura-type curd-tension meter with mounting of a spherical adapter of 10 mm in diameter. The test results shown in the table are the shearing resistance of each sample with a pressing rate of 25 cm per minute expressed in grams.

TABLE 2

Water Contents of Each of the Coagulum and the Curd-Tensions of the Products Prepared with Varied Centrifuging Conditions

| Sample Nos. | Centrifuging Conditions Rate (r.p.m.) | Time (Min.) | Water Content of Coagulum (%) | Curd-Tension (g) |
| --- | --- | --- | --- | --- |
| 1 | 500 | 5 | 91.0 | 15 |
| 2 | 1,000 | 5 | 89.0 | 45 |
| 3 | 2,000 | 5 | 87.0 | 53 |
| 4 | 4,000 | 5 | 83.0 | 73 |
| 5 | 6,000 | 5 | 81.0 | 117 |
| 6 | 8,000 | 5 | 78.0 | 124 |
| 7 | 10,000 | 5 | 76.0 | over 130 |
| 8 | Control Sample | | 87.0 | 52 |

It is apparent from the test results shown in TABLE 2 that the curd-tension of the product is markedly influenced by the water content of the coagulum controlled by varying the centrifuging conditions for dehydration. The product prepared from a coagulum containing over 90% by weight of water, Sample No. 1, is very soft in consistency, while a product prepared from a coagulum containing less than 78% by weight of water, Sample No. 7, could not be shaped to form a uniform curd block and was too hard in consistency so that the product was of low commercial value. From the result of the above test, it is quite important to adjust the water content of the coagulum to 78% to 90% by weight in order to obtain rough textured soya bean curd according to the present invention.

Accordingly, rough textured soya bean curd with varied degrees of elasticity, touch on the tongue and consistency with the use can easily be prepared only by the adjustment of the centrifuging conditions.

The manufacturing method of the present invention has an additional advantage in the above meaning that cannot be expected in the traditional manufacturing method for rough textured soya bean curd.

In the separation step of large quantity of the coagulum, use of a suitable machine such as a curd concentrator (for example, a product by Westfalia Separator A.G.) is recommended.

Next, the coagulum thus separated and dehydrated is then transferred to a filling-packing machine by the aid of a conventional press extruder and subsequently a pump and packed into containers with subsequent sealing. Conventional packing machines are in general suitable as the filling-packing machine to be used in the method of the present invention, but particularly a vertical three-sides-sealing automatic filling-packing machine (for example, a product by Ohmori Machinery Co., Ltd., Model TS-1040) is effectively used. As the material of the containers for packing the coagulum, various kinds of laminated plastics sheets, particularly those made of a nylon film (for example, 15 μm thickness) and a polyethylene film (for example, 50 μm thickness) are recommended. The package of the coagulum is placed in a mold box with a desired shape (usually a parallelepiped with a length 130 mm, width 70 mm and depth 35 mm, and made of stainless steel, for example) and heated to be shaped and pasteurized at the same time using a suitably designed equipment. The reason why the container containing the dehydrated coagulum is to be held in a mold box with a desired shape is to give the product a desired shape identical with the mold box by heating the coagulum packed in the container with indefinite form while keeping the desired shape in a mold box. Therefore, any of mold boxes with a varied shape according to the requirement of use may also be used, though usually a rectangular parallelepiped box made of stainless steel is used as stated above.

As the heat shaping pasteurizer, any of suitably designed equipments such as a heating bath as used in the manufacturing of conventional ready-packed soya bean curd, or a retort sterilizer of a hot air oven can be used. The heating temperature is 60° C. to 135° C. The heating time may be extended by use of a pasteurizing mold machine such as an automatic retainer-boiler designed for in-raw-packed konjak (a product of Ohmori Machinery Co., Ltd.) connected to a cooling machine in series. Products of rough textured soya bean curd with favorable consistency can be prepared when the temperature of the heating bath is kept at 60° C. or higher, particularly at about 90° C. In the sterilization using a retort sterilizer, the coagulum is preferably packed into containers made of laminated plastics sheet including metallic foil, such as those consisting of a polyester film (thickness 12 μm, for example), an aluminum foil (thickness 9 μm, for example) and a polyethylene film (thickness 80 μm, for example). In the heating using a retort sterilizer the inner temperature of retort is 115° C. to 135° C. The desirable heating conditions are usually for about 20 minutes at about 120° C. After the heating, the packages are immediately cooled using a conventional cooling bath.

As stated in the above, manufacturing of rough textured soya bean curd with good flavor and long shelf life is made possible by heating coagulum with controlled water content from soya bean juice sterilized at a high temperature such as 120° C. or higher. The excellence of the product according to the present invention is explained in detail below. Optional adjustment of the consistency of the rough textured soya bean curd is another characteristic feature of the present invention.

The most outstanding effect of the present invention is the manufacture of rough textured soya bean curd which has much longer shelf life as compared with the conventional ones resulting in the surprising increase of the commercial value of the products. Such characteristic features are demonstrated by the TEST 3 showing the test results on the shelf life, flavor, texture and number of colonies of the surviving bacteria in the rough textured soya bean curd according to the present invention in comparison with the conventional ones, that is, with the rough textured soya bean curd on the market and that prepared according to the patent specification Japanese Patent Public Disclosure No. 110847/1974.

TEST 3

In this series of the test, the following 5 kinds of lots were treated:

(Lot No. 1)
Identical with the product prepared in Example 1 described later in this specification.

(Lot No. 2)
Commercial product manufactured by Company (A) and retailed in a supermarket in Tokyo Metropolitan Area. Five blocks were obtained for this test.

(Lot No. 3)
Similar to Lot No. 2, but manufactured by Company "B."

(Lot No. 4)
A product prepared by the manufacturing method described in the patent specification Japanese Patent Public Disclosure No. 110847/1974. The container used for this sample was made of polypropylene and sterilization was carried out for 40 minutes at 90° C.

(Lot No. 5)

A product prepared by the conventional manufacturing method except that the sterilization of the soya bean juice was carried out for 4.8 seconds at 128° C. similarly to Example 1 in this sepcification.

The above 5 kinds of the lots were placed in a air bath equipped with a thermostat and kept at 15° C. Observations for the numbers of colonies of the bacteria, flavor and texture were carried out on the second, 7th, 14th and 30th days after the start of the preserving test. As for Lots No. 2 and No. 3 the first day after the start of the preserving test was regarded as the second day, since these lots were obtained one day after the date of manufacturing indicated on the container. Lots No. 1, No. 4 and No. 5 were subjected to observations for the number of colonies of the bacteria, flavor and texture immediately after the preparation and then to the preservation test at 15° C.

The counting of the numbers of colonies of the bacteria was carried out using the method of the conventional manner.

The sensory tests for the flavor and the texture were carried out in the following manner:

A standard sample was set up for reference using a kind of rough textured soya bean curd purchased from the market manufactured by the same manufacturer, Company "A" previously cited for Sample No. 2. Fresh standard samples were obtained day by day for the observations. The test results for these standard samples were represented as "point 0" in TABLE 3 as explained in Note 2. The sensory tests for the flavor and the texture were carried out by 12 members of the test panelists for each sample. (Lots No. 1 to No. 5 and Standard)

The results of the sensory tests include the evaluations for astringency, fragrance of soya beans and freshness. The test results for the texture include pleasantness on the tongue, resistance to the teeth and smoothness.

The sensory tests were carried out blindly except that only the standard sample was clearly indicated to the test panelists. Other five lots in question (lots No. 1 to No. 5) were given to the test panelists with blind numbers and compared with the standard. Remarks presented by more than half of the panelists are given in TABLE 3.

TABLE 3

| Lot Nos. | Terms | Days of Preservation Directly After Manufacture | 2nd | 7th | 14th | 30th |
|---|---|---|---|---|---|---|
| 1 | Number of bacteria | 0 to 5 | 0 to 5 | 10 to 1300 | 50 to $40 \times 10^2$ | 400 to $20 \times 10^3$ |
|  | Flavor | +15 | +7 | +8 | +4 | −6 |
|  | Texture | +7 | +5 | +2 | +6 | +7 |
|  | Remarks | (1) | (1) | (1) | (1) | (2) |
| 2 | Number of bacteria | — | 1800 to $80 \times 10^3$ | inf. | — | — |
|  | Flavor | — | −2 | −36 | — | — |
|  | Texture | — | +1 | — | — | — |
|  | Remarks | — | (1) | (3) | — | — |
| 3 | Number of bacteria | — | 10 to $40 \times 10^2$ | inf. | — | — |
|  | Flavor | — | +10 | −36 | — | — |
|  | Texture | — | −6 | — | — | — |
|  | Remarks | — | (1) | (3) | — | — |
| 4 | Number of bacteria | 10 to 120 | 70 to 850 | $10 \times 10^4$ to $55 \times 10^6$ | inf. | — |
|  | Flavor | −8 | −14 | −31 | −36 | — |
|  | Texture | −24 | −22 | −28 | — | — |
|  | Remarks | (4) | (4) | (5) | (3) | — |
|  | Number of bacteria | 10 to | 400 to | inf. | — | — |

TABLE 3-continued

| Lot Nos. | Terms | Days of Preservation Directly After Manufacture | 2nd | 7th | 14th | 30th |
|---|---|---|---|---|---|---|
|  | bacteria | $72 \times 10^2$ | $20 \times 10^3$ |  |  |  |
| 5 | Flavor | −3 | −7 | −36 | — | — |
|  | Texture | −27 | −25 | — | — | — |
|  | Remarks | (6) | (7) | (8) | — | — |

NOTES
1 Five multiple samples were tested for each lot, and the lowest number and the highest number of colonies of the bacteria among the five samples are given in the table. The indication "inf." means innumerably large number of colonies of the bacteria.
2 The sensory test values given in the table for the flavor and the texture are the sums of the gradings for the five samples in comparison with the standard sample in the mode shown below:
excellent +3
good +2
slightly good +1
standard 0
slightly poor −1
poor −2
unacceptable −3
3 Remarks:
(1) Both flavor and texture were good.
(2) Texture was good but freshness was slightly lost.
(3) Sour taste. Formation of gas by fermentation was noted. Not edible.
(4) Character of soya bean curd was lost. Unsavory.
(5) taste. Unsavory.
(6) Unpleasant on the tongue.
(7) Texture was poor. Shapes lost. No commercial value.
(8) Both flavor and texture were poor. No com- mercial value.

From the test results given in TABLE 3, it is apparent that the rough textured soya bean curd manufactured according to the present invention retains its commercial value unvaried for at least 14 days from the day of manufacturing when stored at 15° C. Further, the quality of the inventive soya bean curd was almost at the same level as directly after manufacturing even after prolonged storage of 30 days with only very slight decrease in flavor though it was no worse than the conventional products in both flavor and texture.

On the other hand, the rough textured soya bean curd on the market manufactured by Company "A" and Company "B" (Lots No. 2 and No. 3) being unchanged after 2 days of storage at 15° C. in their flavor, texture and number of bacteria, they lost their commercial value altogether by the increase in the number of bacteria after 7 days' storage.

One more soya bean curd, Lot No. 4 showed somewhat longer shelf life as exemplified by the fact that it retained less number of bacteria than the rough textured soya bean curd on the market when examined on the days directly after manufacture and after 2 days' storage, but it lost its commercial value after 14 days' storage by the increase in the number of bacteria. This let had no characteristic freshness of soya bean curd even direactly after manufacture and was not regarded as a favorable product in view of the flavor.

The last of the rough textured soya bean curd lets, Let No. 5 prepared by conventional manufacturing method except that the soya bean juice was sterilized at a high temperature, showed increase in the number of bacteria already on the second day of storage due to the contamination during the manufacturing process and lost its commercial value owing to the multiplication of the bacteria on the 7th day. This product had rather lower commercial value as a rough textured soya bean curd in view of the texture and the pleasantness on the tongue because of the incomplete coagulation.

It is apparent from the above illustrations that the rough textured soya bean curd manufactured by the method of the present invention is an excellent product in comparison with the conventional rough textured soya bean curd, the standard sample in this test, in a fresh condition in the flavor and the texture, and that it has a longer shelf life.

The principal advantages obtained by the present invention are as follows:
(1) The product manufactured by the method of the invention has far longer shelf life than that of the conventional rough textured soya bean curd.
(2) Continuous and mass production of rough textured soya bean curd with a constant quality is realized for the first time by the method of the invention, which heretofore is impossible.
(3) Various kinds of the products with desired elasticity can be easily manufactured conformed to the requirements of uses.
(4) Flavorable products with good flavor can be prepared without dipping in water, since the required amount of the coagulant such as a salt of a divalent metal is about half as much as used in the traditional manufacturing method.

EXAMPLE 1

By dipping in running water for 12 hours, 720 kg of washed soya beans (product of U.S.A.) was swollen followed by grinding down with about 6,500 kg of water. The crude juice of soya bean (so called "Go" in Japan) was then steamed for 3 minutes at 101° C. in a continuous caldren and got rid of refuses by use of a wringer, and further freed from useless fine particles by use of a vibration screen to yield about 6,500 kg of soya bean juice containing 5.8% by weight of solid component.

The soya bean juice was heated for 4.8 seconds at 128° C. using a sterilizer (a product of APV Co., Model R-50), transferred to a hermetic coagulation-reaction vessel, added with 19.5 kg of solid calcium sulfate while being stirred at 70° C. to form coagulum and kept standing for 10 minutes.

Next the coagulum was crushed down homogeneously by use of an agitator and the liquid component was continuously separated using a curd concentrator (a product of Westfalia Separator A.G., Model SIH 10007). The dehydrated coagulum had 87% by weight of water content. Then the coagulum was transferred to a vertical three-sides-sealing automatic filling-packing machine (a product of Ohmeri Machinery Co., Ltd., Model TS-1040) and 300 g portions of it were packed into container followed by hermetical sealing. Laminated sheet composed of a nylon film (thickness 15 μm ) and a polyethylene film (thickness 50 μM) was used as the material for the containers. The packages were placed in mold boxes of stainless steel (length 130 mm, width 70 mm and depth 35 mm) set up on a conveyor, shaped and pasteurized by heating for 50 minutes as 90° C., and cooled for 60 minutes at 20° C. in a water bath to obtain about 10,000 packed blocks of rough textured soya bean curd each weighing 300 g.

The product retained its favorable texture even after 6 weeks' storage at 5° C. in a refrigerator only with slight decrease in freshness.

EXAMPLE 2

By use of a sterilizer Model R-50 manufactured by APV Company, 6,500 kg of soya bean juice prepared by the conventional method from soya beans and containing 4.0% by weight of solid component was heated for 4.8 seconds at 130° C., transferred to a hermetic coagulation-reaction vessel, admixed slowly with 43 liters of 10% by weight aqueous solution of citric acid at 40° C. with stirring to adjust its pH to 5.5 and kept standing for 10 minutes with the stirrer stopped. Then, with gentle stirring once again, the produced coagulum was separated continuously from the liquid component by use of a curd concentrator (a product of Westfalia Separator A.G., Model SIH 10007), transferred to a vertical three-sides sealing automatic filling-packing machine (a product of Ohmeri Machinery Co., Ltd., Model TS-1040) through a molding machine by the aid of a pump and packed into container followed by hermetical sealing each in 300 g portions. Laminated sheet composed of a nylon film (thickness 15 μm) and a polyethylene film (thickness 50 μm) was used as the material of the containers. The water content of the separated coagulum was 87% by weight.

The packages were placed in mold boxes of stainless steel (length 130 mm, width 70 mm and depth 35 mm) set up on a conveyor, shaped and pasteurized by heating for 40 minutes at 90° C. in a hot water bath followed by cooling for 50 minutes at 15° C. in a cold water bath to obtain about 6,500 packed blocks of rough textured soya bean curd each weighing 300 grams. The product did not show any increase in bacterial count and was favorable in both flavor and texture even after 3 weeks' storage at 5° C. in a refrigerator.

What is claimed as new and desired to be secured by Letters Patent of the United States is:
1. A method for manufacturing rough textured soya bean curd having a long shelf life, which comprises the steps of:
(a) sterilizing soya bean juice of a solids content of from about 3% to about 12% by weight by heating the same at a temperature of about 120° C. or higher for a time sufficient to destroy spore forming bacteria to a level less than ten per milliliter of said juice and then cooling said heated juice;
(b) adding a coagulant to the sterilized soya bean juice in amounts sufficient to form a coagulum at a temperature between 20° C. and 90° C.;
(c) dehydrating the coagulum to a water content in the range of from 78% to 90% by weight;
(d) packing the dehydrated coagulum into a container;
(e) sealing the container hermetically; and
(f) heating the coagulum packed in the container at a temperature between 60° C. and 135° C. for a time sufficient to pasteurize said coagulum.
2. The method for manufacturing rough textured soya bean curd of long shelf life according to claim 1, in which said coagulant is selected from a group consisting of salts of divalent metals, organic acids and glucono-deltalactone.
3. The method for manufacturing rough textured soya bean curd of long shelf life according to claim 2, in which said divalent metal salt coagulant is added to the soya bean juice in a concentration of from 7 millimoles per liter to 35 millimoles per liter.
4. The method for manufacturing rough textured soya bean curd of long shelf life according to claim 2, in which said organic acid coagulant is at least one of citric acid or lactic acid.
5. The method for manufacturing rough textured soya bean curd of long shelf life according to claim 2, in which said organic acid as the coagulant is added into the soya bean juice in an amount such that the pH of the soya bean juice becomes 4.8 to 5.8.

6. The method for manufacturing rough textured soya bean curd of long shelf life according to claim 1, in which sais step (c) is carried out using a centrifuge.

7. The method for manufacturing rough textured soya bean curd of long shelf life according to claim 1, in which step a is conducted at a temperature of 120° C. for at least 6 seconds; at 124° C. for at least 2 seconds; at 128° C. for at least 1 second; or at 130° C. for at least 1 second.

8. The method of claim 1, wherein said coagulant is a combination of a divalent metal salt and an organic acid.

9. The method of claim 8, wherein said divalent metal salt is calcium sulfate and said organic acid is citric acid, and wherein the concentration of said coagulant in a sterilized soya bean juice containing 12% by weight solid component is about 3 millimoles per liter of calcium sulfate and about 5 millimoles per liter of citric acid.

* * * * *